(No Model.)
C. LEIDING.
FISH NET SINKER.
No. 460,142. Patented Sept. 29, 1891.
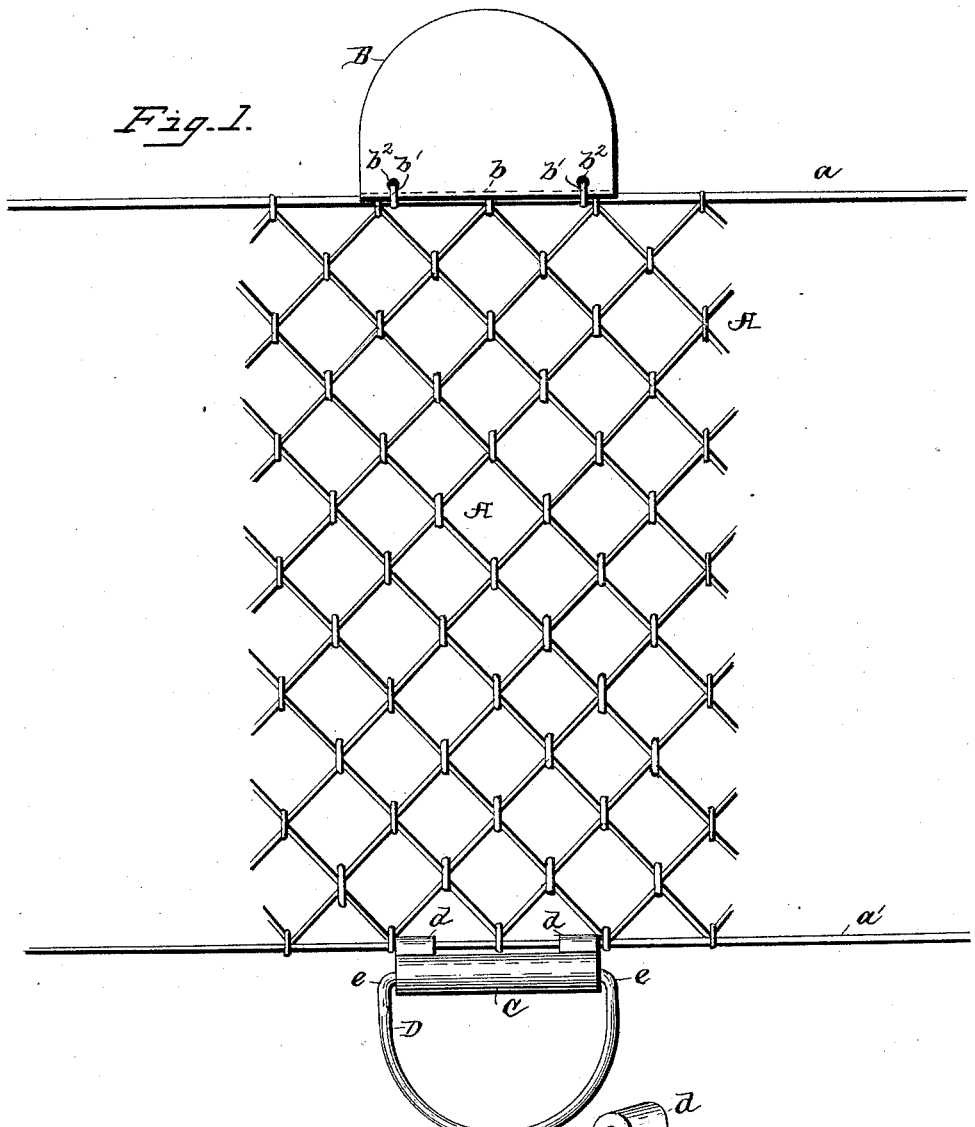
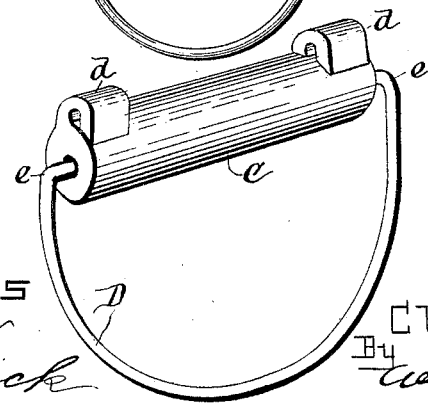
Witnesses
Wm. S. Hodges
D. A. Millrick
Inventor
Charles Leiding
By Ewan Rutherford
Attorney

UNITED STATES PATENT OFFICE.

CHARLES LEIDING, OF DULUTH, MINNESOTA.

FISH-NET SINKER.

SPECIFICATION forming part of Letters Patent No. 460,142, dated September 29, 1891.

Application filed October 2, 1890. Serial No. 366,801. (No model.)

*To all whom it may concern:*

Be it known that I, CHARLES LEIDING, a citizen of the United States of America, residing at Duluth, in the county of St. Louis and State of Minnesota, have invented certain new and useful Improvements in Fish-Nets, of which the following is a specification, reference being had therein to the accompanying drawings.

This invention pertains to certain new and useful improvements in fish-nets, having reference more especially to the floats and sinkers therefor, its object being, first, to prevent the floats and sinkers from becoming entangled in the meshes of the net, and, second, to provide means for readily securing the sinkers to the net, substantially as hereinafter fully set forth, and particularly pointed out in the claims.

In the accompanying drawings, Figure 1 is a view of a portion of a net having my improvements attached thereto. Fig. 2 is a detail perspective view of the sinker.

Referring to the drawings, A designates a net of any preferred form or pattern, having the usual upper and lower cords $a$ $a'$.

B is the float, which is preferably of wood and semicircular in shape, its diameter being about equal to two meshes of the net. In the lower edge of the float is formed a groove $b$, wherein the upper cord $a$ of the net is held by two cords or straps $b'$ passed through holes or apertures $b^2$ in float B. By making the float as described it is impossible for the same to become entangled in the net.

C is the lead sinker, which has formed therewith two flexible ears $d$, designed to overlap and be closed down upon the lower cord $a'$ of the net, said sinker being placed diametrically opposite the float.

To the sinker are secured the ends of a bail or loop D, made of wire and having right-angular ends $e$, which are inserted in end sockets of the sinker. This bail or loop gives to the sinker as a whole the outline or conformation of the float, and in consequence prevents the sinker from becoming entangled in the meshes of the net.

From the foregoing description it will be seen that I have provided simple and highly-efficient means by which a net may be held in place and all entanglement of the floats and sinkers thereof is avoided, and also means by which the sinker can be readily secured to or detached from the net.

I claim as my invention—

1. A fish-net having a sinker secured to its lower edge and a pivoted bail or loop depending from said sinker, as set forth.

2. A fish-net having a sinker secured to its lower edge and provided with socketed ends, and the bail or loop having angular ends inserted in said socketed ends, substantially as set forth.

3. The herein-described improved sinker, having the flexible ears and socketed ends, and the bail or loop having angular ends inserted in said socketed ends, substantially as set forth.

In testimony whereof I affix my signature in presence of two witnesses.

CHARLES LEIDING.

Witnesses:
CHAS. F. HOPKINS,
R. A. THOMSON.